United States Patent
Wei

(10) Patent No.: US 11,824,568 B2
(45) Date of Patent: Nov. 21, 2023

(54) ANTENNA STRUCTURE

(71) Applicant: Wistron NeWeb Corp., Hsinchu (TW)

(72) Inventor: Shih-Chiang Wei, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 29 days.

(21) Appl. No.: 17/480,200

(22) Filed: Sep. 21, 2021

(65) Prior Publication Data

US 2022/0399907 A1 Dec. 15, 2022

(30) Foreign Application Priority Data

Jun. 11, 2021 (TW) ................................. 110121414

(51) Int. Cl.
*H04B 1/00* (2006.01)
*H01Q 1/38* (2006.01)
*H01Q 1/48* (2006.01)
*H01Q 1/24* (2006.01)

(52) U.S. Cl.
CPC ............. *H04B 1/0053* (2013.01); *H01Q 1/38* (2013.01); *H01Q 1/48* (2013.01); *H01Q 1/243* (2013.01)

(58) Field of Classification Search
CPC .......... H04B 1/0053; H01Q 1/38; H01Q 1/48; H01Q 1/243; H01Q 5/392; H01Q 5/40
See application file for complete search history.

(56) References Cited

U.S. PATENT DOCUMENTS

| | | | | |
|---|---|---|---|---|
| 2,421,033 A | * | 5/1947 | Mason | H01P 1/2133 333/134 |
| 5,483,678 A | * | 1/1996 | Abe | H01Q 1/38 343/702 |
| 6,184,836 B1 | * | 2/2001 | Ali | H01Q 5/378 343/866 |
| 6,204,826 B1 | * | 3/2001 | Rutkowski | H01Q 5/371 343/895 |
| 6,765,539 B1 | * | 7/2004 | Wang | H01Q 21/30 343/700 MS |
| 6,927,731 B2 | * | 8/2005 | Leclerc | H01Q 5/378 343/702 |

(Continued)

FOREIGN PATENT DOCUMENTS

| | | | | |
|---|---|---|---|---|
| CA | 3086869 A1 | * | 1/2021 | ............. H01Q 21/24 |
| CN | 102148420 A | * | 8/2011 | ............... H01Q 1/38 |

(Continued)

*Primary Examiner* — Dimary S Lopez Cruz
*Assistant Examiner* — Jordan E. DeWitt
(74) *Attorney, Agent, or Firm* — McClure, Qualey & Rodack, LLP

(57) ABSTRACT

An antenna structure includes a ground element, a first radiation element, a second radiation element, a third radiation element, and a dielectric substrate. The first radiation element has a feeding point. The first radiation element is coupled to a first grounding point on the ground element. The second radiation element is coupled to the feeding point. The third radiation element is coupled to a second grounding point on the ground element. The third radiation element is adjacent to the second radiation element. The ground element, the first radiation element, the second radiation element, and the third radiation element are all disposed on the dielectric substrate.

18 Claims, 15 Drawing Sheets

(56) References Cited

U.S. PATENT DOCUMENTS

| | | | | |
|---|---|---|---|---|
| 6,946,997 B2* | 9/2005 | Yuanzhu | H01Q 1/3291 | 343/700 MS |
| 6,980,173 B2* | 12/2005 | Man | H01Q 1/243 | 343/702 |
| 7,180,465 B2* | 2/2007 | Lynch | H01Q 3/44 | 343/702 |
| 7,233,289 B2* | 6/2007 | Chung | H01Q 9/30 | 343/702 |
| 7,301,502 B2* | 11/2007 | Sinasi | H01Q 5/378 | 343/702 |
| 7,579,998 B1* | 8/2009 | Fang | H01Q 1/38 | 343/700 MS |
| 7,598,921 B2* | 10/2009 | Ge | H01Q 5/357 | 343/700 MS |
| 7,602,341 B2* | 10/2009 | Wei-Shan | H01Q 1/2258 | 343/702 |
| 7,825,863 B2* | 11/2010 | Martiskainen | H01Q 9/42 | 343/702 |
| 7,990,321 B2* | 8/2011 | Shih | H01Q 5/378 | 343/702 |
| 8,022,882 B2* | 9/2011 | Tsai | H01Q 5/385 | 343/702 |
| 8,130,164 B2* | 3/2012 | Semonov | H01Q 1/38 | 343/700 MS |
| 8,421,705 B2* | 4/2013 | Chen | H01Q 9/42 | 343/846 |
| 8,493,183 B2* | 7/2013 | Yamagajp | H01Q 1/38 | 343/866 |
| 8,537,054 B2* | 9/2013 | Yen | H01Q 5/371 | 343/846 |
| 8,638,271 B2* | 1/2014 | Wang | H01Q 21/30 | 343/846 |
| 8,654,022 B2* | 2/2014 | Brown | H01Q 7/005 | 343/726 |
| 8,779,986 B2* | 7/2014 | Fan | H01Q 5/371 | 343/700 MS |
| 8,810,467 B2* | 8/2014 | Lee | H01Q 5/25 | 343/817 |
| 8,816,924 B2* | 8/2014 | Wong | H01Q 9/40 | 343/702 |
| 9,142,884 B2* | 9/2015 | Yukimoto | H01Q 1/2283 | |
| 9,172,142 B2* | 10/2015 | Sudo | H01Q 21/06 | |
| 9,350,082 B2* | 5/2016 | Huang | H01Q 5/378 | |
| 9,735,822 B1* | 8/2017 | Kuo | H01Q 1/245 | |
| 9,748,641 B2* | 8/2017 | Miura | H01Q 5/10 | |
| 9,905,912 B2* | 2/2018 | Wu | H01Q 9/42 | |
| 9,917,357 B2* | 3/2018 | Tanaka | H01Q 1/243 | |
| 10,389,024 B2* | 8/2019 | Tseng | H01Q 9/42 | |
| 10,403,976 B2* | 9/2019 | Uchida | H01Q 5/328 | |
| 10,411,333 B1* | 9/2019 | Chang | G06F 1/1698 | |
| 10,454,156 B1* | 10/2019 | Yang | H01Q 1/48 | |
| 10,454,176 B2* | 10/2019 | Koga | H01Q 1/48 | |
| 10,535,916 B2* | 1/2020 | Lim | H01Q 5/40 | |
| 10,542,130 B1* | 1/2020 | Lo | H04M 1/026 | |
| 10,608,344 B2* | 3/2020 | Paulotto | H01Q 3/2652 | |
| 10,651,540 B2* | 5/2020 | Nishikawa | H01Q 1/38 | |
| 10,727,580 B2* | 7/2020 | Rajagopalan | H01Q 5/328 | |
| 10,797,379 B1* | 10/2020 | Lee | H01Q 5/378 | |
| 10,910,696 B2* | 2/2021 | Chang | H01Q 9/42 | |
| 10,950,943 B2* | 3/2021 | Chen | H01Q 1/243 | |
| 11,056,792 B2* | 7/2021 | Xia | H01Q 21/065 | |
| 11,128,050 B1* | 9/2021 | Chuang | H01Q 5/371 | |
| 11,139,559 B2* | 10/2021 | Wei | H01Q 5/364 | |
| 11,139,566 B2* | 10/2021 | Chang | H01Q 1/52 | |
| 11,233,331 B2* | 1/2022 | Nakano | H01Q 1/48 | |
| 11,349,219 B2* | 5/2022 | Toyao | H01Q 5/307 | |
| 11,539,133 B2* | 12/2022 | Chang | H01Q 9/26 | |
| 2002/0145569 A1* | 10/2002 | Onaka | H01Q 1/2283 | 343/702 |
| 2003/0174092 A1* | 9/2003 | Sullivan | H01Q 1/243 | 343/702 |
| 2004/0104849 A1* | 6/2004 | Tai | H01Q 5/371 | 343/702 |
| 2004/0113847 A1* | 6/2004 | Qi | H01Q 1/36 | 343/702 |
| 2005/0007280 A1* | 1/2005 | Tsai | H01Q 9/0407 | 343/702 |
| 2005/0270242 A1* | 12/2005 | Qi | H01Q 7/00 | 343/702 |
| 2006/0152429 A1* | 7/2006 | Pan | H01Q 1/38 | 343/895 |
| 2007/0279288 A1* | 12/2007 | Liu | H01Q 1/243 | 343/702 |
| 2008/0111745 A1* | 5/2008 | Takada | H01Q 9/0457 | 343/700 MS |
| 2008/0169982 A1* | 7/2008 | Mei | H01Q 9/40 | 343/700 MS |
| 2008/0246678 A1* | 10/2008 | Rao | H01Q 9/0421 | 343/770 |
| 2009/0021448 A1* | 1/2009 | Tsai | H01Q 1/38 | 343/893 |
| 2009/0262026 A1* | 10/2009 | Yu | H01Q 9/0442 | 343/700 MS |
| 2010/0060542 A1* | 3/2010 | Zheng | H01Q 7/00 | 343/866 |
| 2010/0309087 A1* | 12/2010 | Tsai | H01Q 9/42 | 343/861 |
| 2011/0037659 A1* | 2/2011 | Yanagi | H01Q 1/085 | 343/700 MS |
| 2011/0080330 A1* | 4/2011 | Lee | H01Q 1/38 | 343/785 |
| 2012/0242555 A1* | 9/2012 | Hsieh | H01Q 5/378 | 343/860 |
| 2013/0057442 A1* | 3/2013 | Brown | H01Q 21/24 | 343/750 |
| 2013/0076587 A1* | 3/2013 | Wong | H01Q 1/48 | 343/848 |
| 2013/0120214 A1* | 5/2013 | Tseng | H01Q 1/48 | 343/846 |
| 2013/0257660 A1* | 10/2013 | Wong | H01Q 5/371 | 343/702 |
| 2014/0043200 A1* | 2/2014 | Wei | H01Q 1/48 | 343/846 |
| 2014/0194078 A1* | 7/2014 | Hikino | H04B 1/385 | 455/90.2 |
| 2015/0200457 A1* | 7/2015 | Chan | H01Q 5/357 | 343/700 MS |
| 2015/0263430 A1* | 9/2015 | Lin | H01Q 5/40 | 343/767 |
| 2015/0302231 A1* | 10/2015 | Makimoto | G06K 19/0672 | 235/492 |
| 2017/0141473 A1* | 5/2017 | Sharawi | H01Q 5/321 | |
| 2017/0264002 A1* | 9/2017 | Yen | H01Q 9/26 | |
| 2018/0115048 A1* | 4/2018 | Kagaya | H01Q 5/40 | |
| 2018/0123244 A1* | 5/2018 | An | H01Q 1/36 | |
| 2018/0131075 A1* | 5/2018 | Huang | H01Q 9/42 | |
| 2018/0294553 A1* | 10/2018 | Lim | H01Q 5/35 | |
| 2019/0027811 A1* | 1/2019 | Chen | H01Q 13/10 | |
| 2019/0131693 A1* | 5/2019 | Lee | H01Q 1/243 | |
| 2019/0165475 A1* | 5/2019 | Shibata | H01Q 1/48 | |
| 2019/0221937 A1* | 7/2019 | Onaka | H01Q 21/28 | |
| 2019/0229421 A1* | 7/2019 | Onaka | H01Q 9/045 | |
| 2019/0372241 A1* | 12/2019 | Sharawi | H01Q 9/0421 | |
| 2020/0052416 A1* | 2/2020 | Yong | H01Q 21/08 | |
| 2020/0076049 A1* | 3/2020 | Chang | H01Q 5/378 | |
| 2020/0076061 A1* | 3/2020 | Chen | H01Q 21/0068 | |
| 2020/0091595 A1* | 3/2020 | Lee | H01Q 1/22 | |
| 2020/0161769 A1* | 5/2020 | Hu | H01Q 13/16 | |
| 2020/0168993 A1* | 5/2020 | Wei | H01Q 1/24 | |
| 2020/0185813 A1* | 6/2020 | Chang | H01Q 1/48 | |
| 2020/0185831 A1* | 6/2020 | Chen | H01Q 9/30 | |
| 2020/0259251 A1* | 8/2020 | Seo | H01Q 1/42 | |
| 2020/0274227 A1* | 8/2020 | Tu | H01Q 7/00 | |
| 2020/0274231 A1* | 8/2020 | Wei | H01Q 5/364 | |
| 2020/0358197 A1* | 11/2020 | Nakano | H01Q 5/364 | |
| 2020/0411994 A1* | 12/2020 | Chen | H01Q 9/0407 | |
| 2021/0005952 A1* | 1/2021 | Chang | H01Q 1/243 | |
| 2021/0036431 A1* | 2/2021 | Wu | H01Q 1/52 | |
| 2021/0044000 A1* | 2/2021 | Chang | H01Q 1/38 | |
| 2021/0066786 A1* | 3/2021 | Yarga | H01Q 1/243 | |

(56) References Cited

U.S. PATENT DOCUMENTS

| | | | | |
|---|---|---|---|---|
| 2021/0175611 | A1* | 6/2021 | Chang | H01Q 1/088 |
| 2021/0249776 | A1* | 8/2021 | Wei | H01Q 5/328 |
| 2022/0006198 | A1* | 1/2022 | Edwards | H01Q 1/38 |
| 2022/0131267 | A1* | 4/2022 | Chen | H01Q 5/364 |
| 2022/0131268 | A1* | 4/2022 | Lo | H01Q 9/42 |
| 2022/0255226 | A1* | 8/2022 | Wang | H01Q 1/48 |

FOREIGN PATENT DOCUMENTS

| | | | | | |
|---|---|---|---|---|---|
| CN | 104838539 | A | * | 8/2015 | H01Q 1/243 |
| CN | 206076499 | U | * | 4/2017 | H01Q 1/243 |
| CN | 106058456 | B | * | 9/2017 | H01Q 1/38 |
| CN | 103943942 | B | * | 8/2018 | H01Q 1/243 |
| CN | 108400424 | A | * | 8/2018 | H01Q 1/22 |
| CN | 108847534 | A | * | 11/2018 | H01Q 1/36 |
| CN | 106816703 | B | * | 2/2019 | |
| CN | 107872936 | B | * | 10/2020 | H01Q 1/243 |
| CN | 107968256 | B | * | 10/2020 | H01Q 1/38 |
| CN | 111786134 | A | * | 10/2020 | H01Q 1/2258 |
| CN | 111864358 | A | * | 10/2020 | |
| CN | 112952344 | A | * | 6/2021 | H01Q 1/22 |
| CN | 113285212 | A | * | 8/2021 | |
| CN | 113659343 | A | * | 11/2021 | |
| CN | 114156659 | A | * | 3/2022 | |
| EP | 2675014 | A1 | * | 12/2013 | G06K 19/07786 |
| EP | 2416444 | B1 | * | 11/2015 | H01Q 1/243 |
| EP | 3543982 | A1 | * | 9/2019 | |
| FR | 2884972 | B1 | * | 10/2006 | H01Q 1/22 |
| GB | 2475802 | A | * | 6/2011 | H01Q 5/00 |
| GB | 2513755 | A | * | 11/2014 | H01Q 5/385 |
| JP | 2001358127 | A | * | 12/2001 | H01J 37/32192 |
| JP | 2008278109 | A | * | 11/2008 | |
| TW | I533509 | B | | 5/2016 | |
| TW | I590522 | B | | 7/2017 | |
| TW | I698051 | B | | 7/2020 | |
| TW | I699930 | B | | 7/2020 | |
| TW | 719824 | B1 | * | 2/2021 | H01Q 1/48 |
| TW | 730890 | B1 | * | 6/2021 | H01Q 1/48 |
| TW | 737360 | B1 | * | 8/2021 | H01Q 1/38 |
| TW | 748700 | B1 | * | 12/2021 | H01Q 1/243 |
| WO | WO-0163699 | A2 | * | 8/2001 | H01Q 1/246 |
| WO | WO-2005036697 | A1 | * | 4/2005 | H01Q 1/243 |
| WO | WO-2005048404 | A1 | * | 5/2005 | H01Q 1/243 |
| WO | WO-2012053494 | A1 | * | 4/2012 | H01Q 1/3233 |
| WO | WO-2021238347 | A1 | * | 12/2021 | H01Q 1/38 |

* cited by examiner

ANTENNA STRUCTURE

CROSS REFERENCE TO RELATED APPLICATIONS

This application claims priority of Taiwan Patent Application No. 110121414 filed on Jun. 11, 2021, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a first radiation element, a second radiation element, a third radiation element, and a dielectric substrate. The first radiation element has a feeding point. The first radiation element is coupled to a first grounding point on the ground element. The second radiation element is coupled to the feeding point. The third radiation element is coupled to a second grounding point on the ground element. The third radiation element is adjacent to the second radiation element. The ground element, the first radiation element, the second radiation element, and the third radiation element are all disposed on the dielectric substrate.

In some embodiments, the antenna structure covers a low-frequency band, a first high-frequency band, a second high-frequency band, and a third high-frequency band.

In some embodiments, the first radiation element substantially has an inverted U-shape for at least partially surrounding a slot region.

In some embodiments, the second radiation element substantially has a straight-line shape.

In some embodiments, the third radiation element substantially has a T-shape.

In some embodiments, a coupling gap is formed between the third radiation element and the second radiation element.

In some embodiments, the antenna structure further includes a fourth radiation element coupled to a first connection point on the first radiation element. The fourth radiation element is disposed inside the slot region. The fourth radiation element substantially has an inverted T-shape.

In some embodiments, the antenna structure further includes a fifth radiation element coupled to a second connection point on the first radiation element. The fifth radiation element is disposed inside the slot region. The fifth radiation element substantially has a rectangular shape.

In some embodiments, the length of the first radiation element is substantially equal to 0.5 wavelength of the low-frequency band.

In some embodiments, the total length of the second radiation element and the third radiation element is substantially equal to 0.5 wavelength of the first high-frequency band.

In some embodiments, the length of the second radiation element is substantially equal to 0.25 wavelength of the second high-frequency band.

In some embodiments, the first radiation element includes a first segment, a second segment and a third segment. The second radiation element includes a fourth segment and a fifth segment. The first segment and the fourth segment are coupled to the feeding point. The third segment is coupled to the first grounding point.

In some embodiments, the dielectric substrate has a first surface and a second surface which are opposite to each other. The ground element, the first segment, the third segment, the fourth segment and the third radiation element are disposed on the first surface of the dielectric substrate. The second segment and the fifth segment are disposed on the second surface of the dielectric substrate.

In some embodiments, the fourth segment is directly coupled to the first segment, and the fifth segment is directly coupled to the second segment.

In some embodiments, a coupling gap is formed between the third segment and the first segment.

In some embodiments, the second segment has a first vertical projection on the first surface of the dielectric substrate, and the first vertical projection at least partially overlaps the first segment and the third segment.

In some embodiments, the fifth segment has a second vertical projection on the first surface of the dielectric substrate, and the second vertical projection at least partially overlaps the fourth segment.

In some embodiments, the distance between the fourth segment and the third radiation element is longer than or equal to 3 mm.

In some embodiments, the antenna structure further includes one or more conductive via elements for penetrating the dielectric substrate. The conductive via elements are coupled between the third segment and the second segment.

In some embodiments, the dielectric substrate is a PCB (Printed Circuit Board) or an FPC (Flexible Printed Circuit).

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
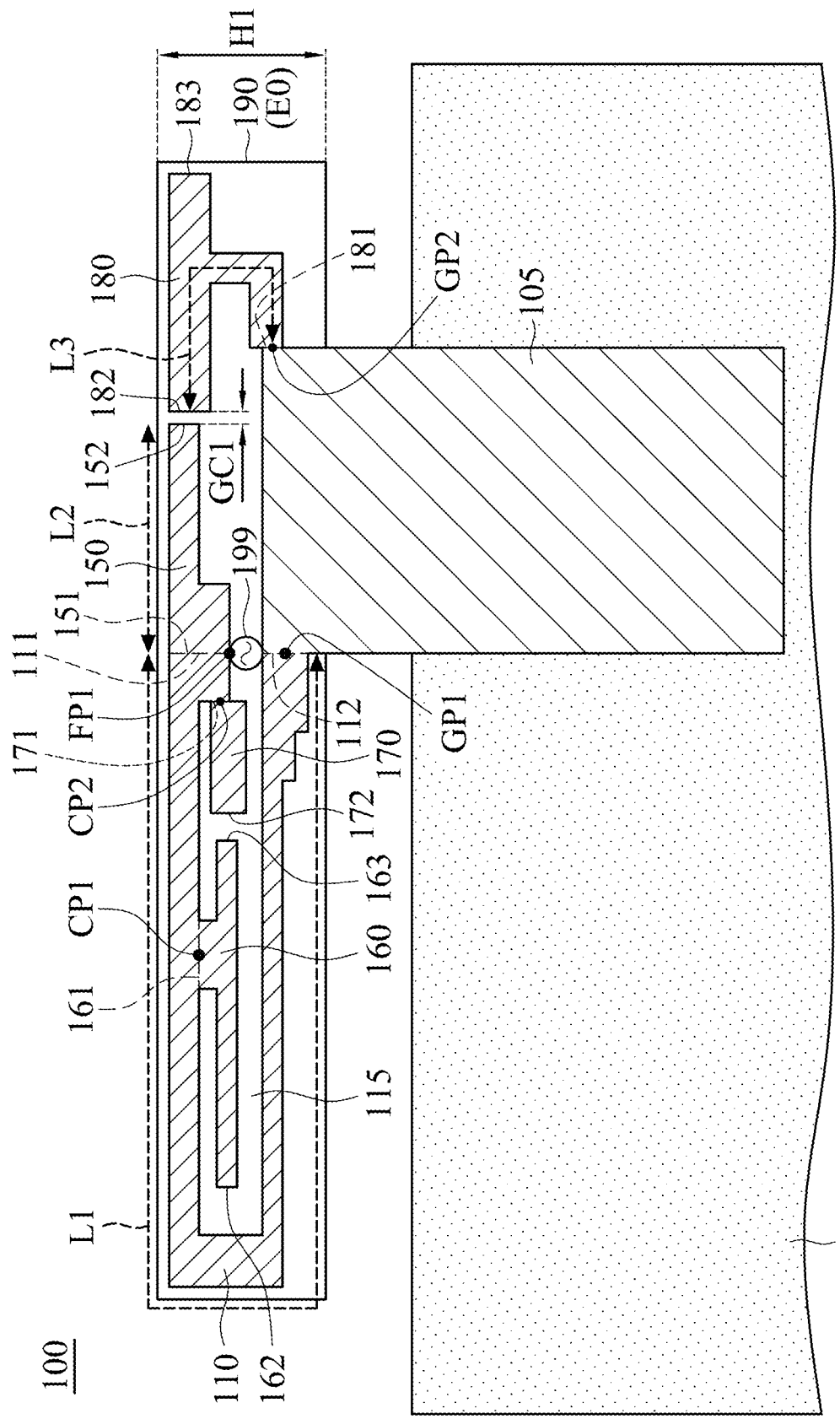
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a top view of an antenna structure 100 according to an embodiment of the invention. The antenna structure 100 may be applied to a mobile device, such as a smart phone, a tablet computer, or a notebook computer. In the embodiment of FIG. 1, the antenna structure 100 at least includes a ground element 105, a first radiation element 110, a second radiation element 150, a third radiation element 180, and a dielectric substrate 190. The ground element 105, the first radiation element 110, the second radiation element 150, and the third radiation element 180 may all be made of metal materials, such as copper, silver, aluminum, iron, or their alloys.

The dielectric substrate 190 may be a PCB (Printed Circuit Board). The ground element 105, the first radiation element 110, the second radiation element 150, the third radiation element 180 may all be disposed on the same surface E0 of the dielectric substrate 190. The ground element 105 may be implemented with a ground copper foil, which may extend beyond the dielectric substrate 190 and may be coupled to a system ground 106.

The first radiation element 110 may substantially have an inverted U-shape for at least partially surrounding a slot region 115. Specifically, the first radiation element 110 has a first end 111 and a second end 112. A feeding point FP1 is positioned at the first end 111 of the first radiation element 110. The second end 112 of the first radiation element 110 is coupled to a first grounding point GP1 on the ground element 105. The feeding point FP1 may be further coupled to a signal source 199, such as an RF (Radio Frequency) module, for exciting the antenna structure 100. In some embodiments, the first radiation element 110 is a variable-width structure for fine-tuning the impedance matching of the antenna structure 100. In alternative embodiments, the first radiation element 110 is an equal-width structure.

The second radiation element 150 may substantially have a straight-line shape. Specifically, the second radiation element 150 has a first end 151 and a second end 152. The first end 151 of the second radiation element 150 is coupled to the feeding point FP1. The second end 152 of the second radiation element 150 is an open end. In some embodiments, the second radiation element 150 is a variable-width structure for fine-tuning the impedance matching of the antenna structure 100. In alternative embodiments, the second radiation element 150 is an equal-width structure.

The third radiation element 180 may substantially have a T-shape. Specifically, the third radiation element 180 has a first end 181, a second end, and a third end 183. The first end 181 of the third radiation element 180 is coupled to a second grounding point GP2 on the ground element 105. The second end 182 and the third end 183 of the third radiation element 180 are two open ends, which extend away from each other. The second end 182 of the third radiation element 180 is adjacent to the second end 152 of the second radiation element 150. It should be noted that the term "adjacent" or "close" over the disclosure means that the distance (spacing) between two corresponding elements is smaller than a predetermined distance (e.g., 5 mm or the shorter), but often does not mean that the two corresponding elements directly touch each other (i.e., the aforementioned distance/spacing therebetween is reduced to 0). In some embodiments, a coupling gap GC1 is formed between the second end 182 of the third radiation element 180 and the second end 152 of the second radiation element 150.

In some embodiments, the antenna structure 100 further includes a fourth radiation element 160, which may be made of a metal material and disposed on the surface E0 of the dielectric substrate 190. The fourth radiation element 160 may substantially have an inverted T-shape, and it may be disposed inside the slot region 115. Specifically, the fourth radiation element 160 has a first end 161, a second end 162, and a third end 163. The first end 161 of the fourth radiation element 160 is coupled to a first connection point CP1 on the first radiation element 110. The second end 162 and the third end 163 of the fourth radiation element 160 are two open ends, which extend away from each other.

In some embodiments, the antenna structure 100 further includes a fifth radiation element 170, which may be made of a metal material and disposed on the surface E0 of the dielectric substrate 190. The fifth radiation element 170 may substantially have a rectangular shape, and it may be disposed inside the slot region 115. Specifically, the fifth radiation element 170 has a first end 171 and a second end 172. The first end 171 of the fifth radiation element 170 is coupled to a second connection point CP2 on the first radiation element 110. The second end 172 of the fifth radiation element 170 is an open end, which is adjacent to the third end 163 of the fourth radiation element 160. The second connection point CP2 is different from the first connection point CP1, and is adjacent to the feeding point FP1. It should be understood that the fourth radiation element 160 and the fifth radiation element 170 are both optional components, which are removable in other embodiments.

Figure 2:
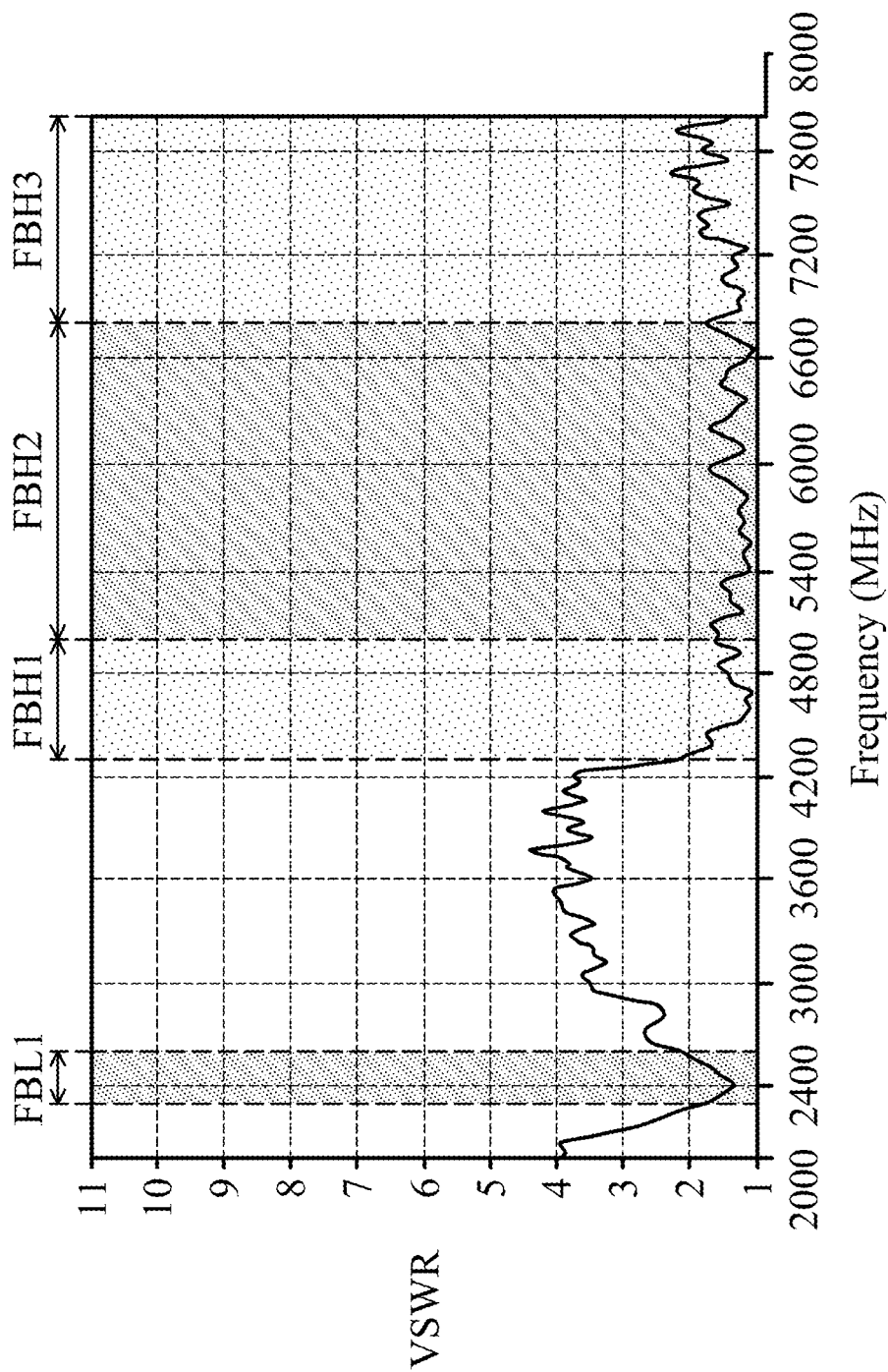
FIG. 2 is a diagram of VSWR (Voltage Standing Wave Ratio) of an antenna structure according to an embodiment of the invention.

FIG. 2 is a diagram of VSWR (Voltage Standing Wave Ratio) of the antenna structure 100 according to an embodiment of the invention. The horizontal axis represents the operational frequency (MHz), and the vertical axis represents the VSWR. According to the measurement of FIG. 2, when being excited by the signal source 199, the antenna structure 100 can cover a low-frequency band FBL1, a first high-frequency band FBH1, a second high-frequency band FBH2, and a third high-frequency band FBH3. For example, the low-frequency band FBL1 may be from 2300 MHz to 2600 MHz. The first high-frequency band FBH1 may be from 4300 MHz to 5000 MHz. The second high-frequency band FBH2 may be from 5000 MHz to 6800 MHz. The third high-frequency band FBH3 may be from 6800 MHz to 8000 MHz. Accordingly, the antenna structure 100 can support at least the wideband operations of conventional WLAN (Wireless Local Area Network) and Wi-Fi 6E of the next generation.

In some embodiments, the operational principles of the antenna structure 100 will be described as follows. The first radiation element 110 is excited to generate a fundamental resonant mode, thereby forming the low-frequency band FBL1. The third radiation element 180 is excited by the second radiation element 150 using a coupling mechanism, so as to form the first high-frequency band FBH1. The second radiation element 150 is independently excited to form the second high-frequency band FBH2. The first radiation element 110 is further excited to generate a higher-order resonant mode, thereby forming the third high-frequency band FBH3. Furthermore, the fourth radiation element 160 and the fifth radiation element 170 can fine-tune the impedance matching of the antenna structure 100, so as to increase the operation bandwidths of the low-frequency band FBL1, the first high-frequency band FBH1, the second high-frequency band FBH2, and the third high-frequency band FBH3.

Figure 3:
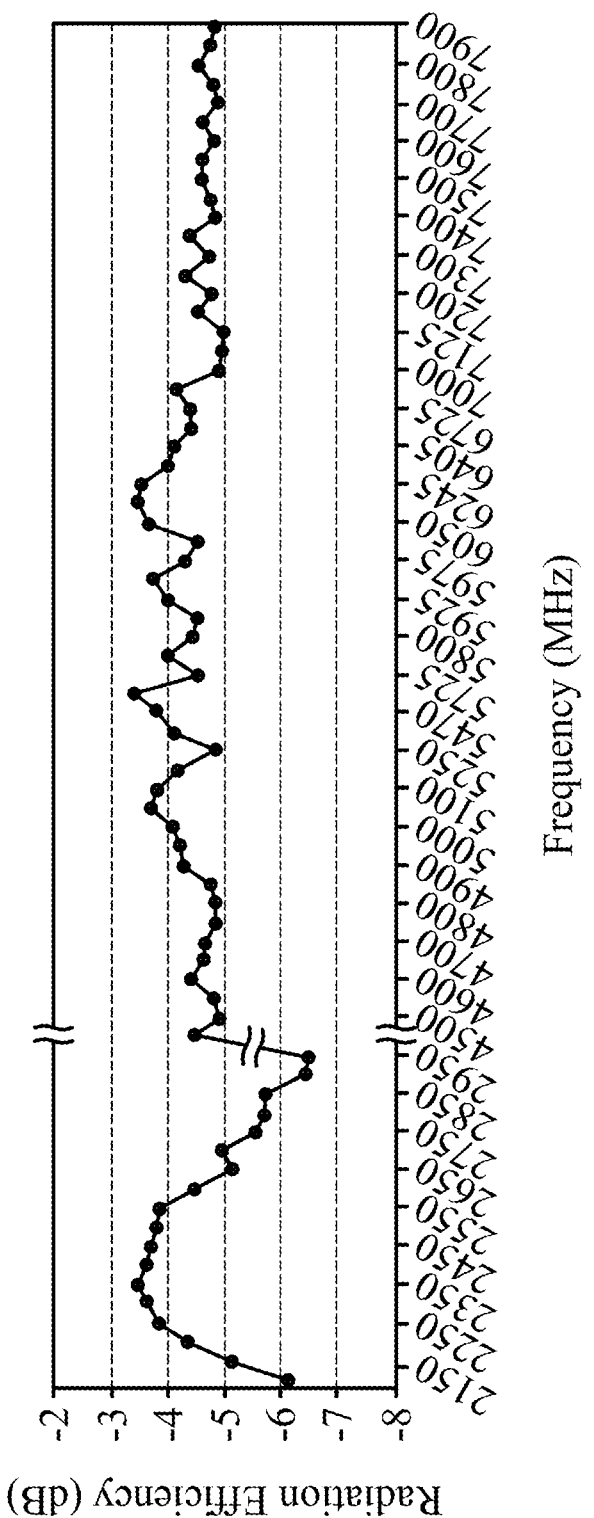
FIG. 3 is a diagram of radiation efficiency of an antenna structure according to an embodiment of the invention.

FIG. 3 is a diagram of radiation efficiency of the antenna structure 100 according to an embodiment of the invention. The horizontal axis represents the operational frequency (MHz), and the vertical axis represents the radiation efficiency (dB). According to the measurement of FIG. 3, the radiation efficiency of the antenna structure 100 can achieve −5 dB or higher within the low-frequency band FBL1, the first high-frequency band FBH1, the second high-frequency band FBH2, and the third high-frequency band FBH3 as mentioned above. It can meet the requirements of practical applications of WLAN and Wi-Fi 6E communication.

In some embodiments, the element sizes of the antenna structure 100 will be described as follows. The length L1 of the first radiation element 110 may be substantially equal to 0.5 wavelength ($\lambda/2$) of the low-frequency band FBL1 of the antenna structure 100, or may be substantially equal to 1.5 wavelength ($3\lambda/2$) of the third high-frequency band FBH3 of the antenna structure 100. The sum (L2+L3) of the length L2 of the second radiation element 150 and the length L3 of the third radiation element 180 may be substantially equal to 0.5 wavelength ($\lambda/2$) of the first high-frequency band FBH1 of the antenna structure 100. The length L2 of the second radiation element 150 may be substantially equal to 0.25 wavelength ($\lambda/4$) of the second high-frequency band FBH2 of the antenna structure 100. The height H1 of the dielectric substrate 190 may be shorter than or equal to 4 mm. The width of the coupling gap GC1 may be shorter than or equal to 3 mm. The above ranges of element sizes are calculated and obtained according to many experiment results, and they help to optimize the operational bandwidth and impedance matching of the antenna structure 100.

Since the antenna structure 100 has characteristics of wide bandwidth and low profile, it is suitable for application in narrow border designs. The following embodiments will introduce other modified configurations of the antenna structure 100, and they can provide similar levels of performance. It should be understood that these figures and descriptions are merely exemplary, rather than limitations of the invention.

Figure 4A:
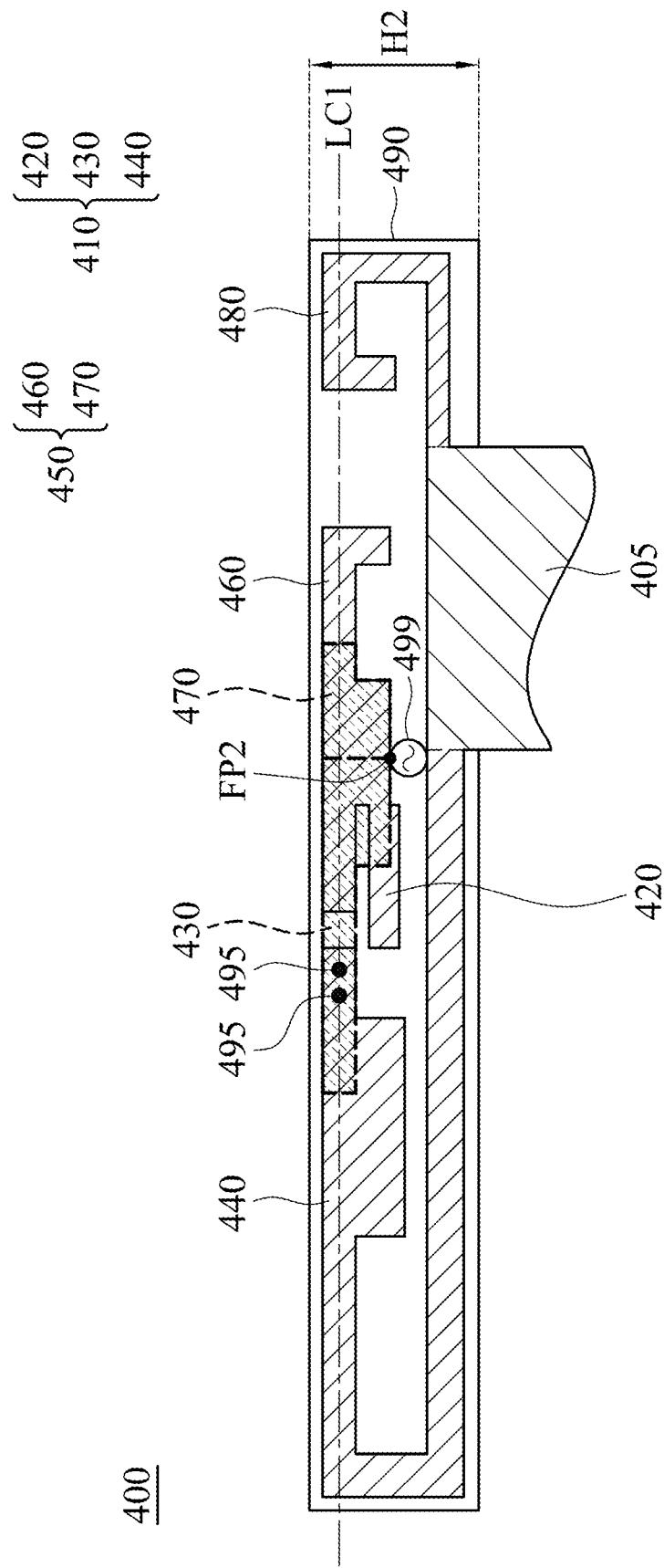
FIG. 4A is a top view of an antenna structure according to an embodiment of the invention.

FIG. 4A is a top view of an antenna structure 400 according to an embodiment of the invention. In the embodiment of FIG. 4A, the antenna structure 400 at least includes a ground element 405, a first radiation element 410, a second radiation element 450, a third radiation element 480, and a dielectric substrate 490. The ground element 405, the first radiation element 410, the second radiation element 450, and the third radiation element 480 may all be made of metal materials. Specifically, the first radiation element 410 includes a first segment 420, a second segment 430, and a third segment 440. The second radiation element 450 includes a fourth segment 460 and a fifth segment 470. The fourth segment 460 is directly coupled to the first segment 420. The fifth segment 470 is directly coupled to the second segment 430.

Figure 4B:
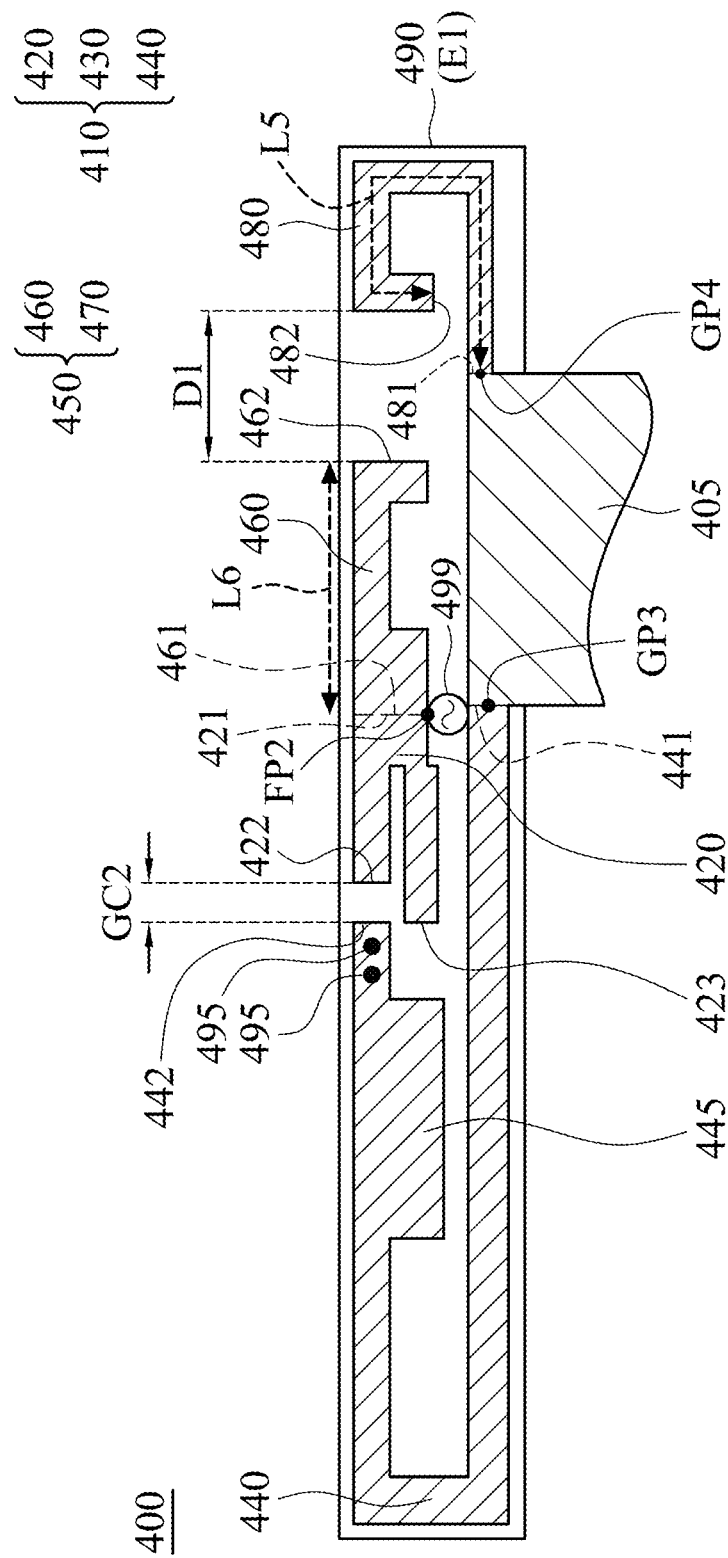
FIG. 4B is a top view of partial elements of an antenna structure disposed on a first surface of a dielectric substrate according to an embodiment of the invention.
Figure 4C:
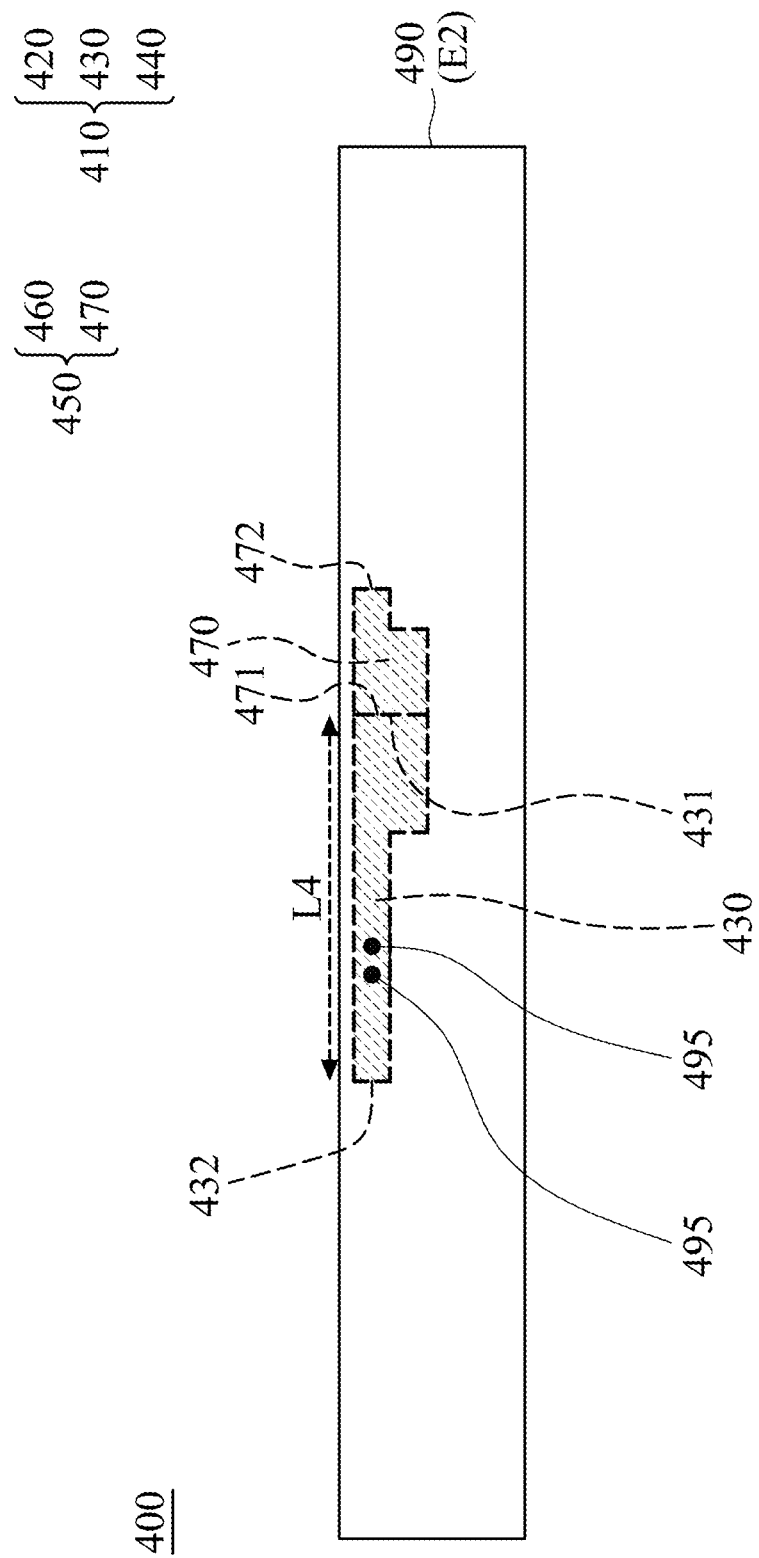
FIG. 4C is a see-through view of other elements of an antenna structure disposed on a second surface of a dielectric substrate according to an embodiment of the invention.
Figure 4D:
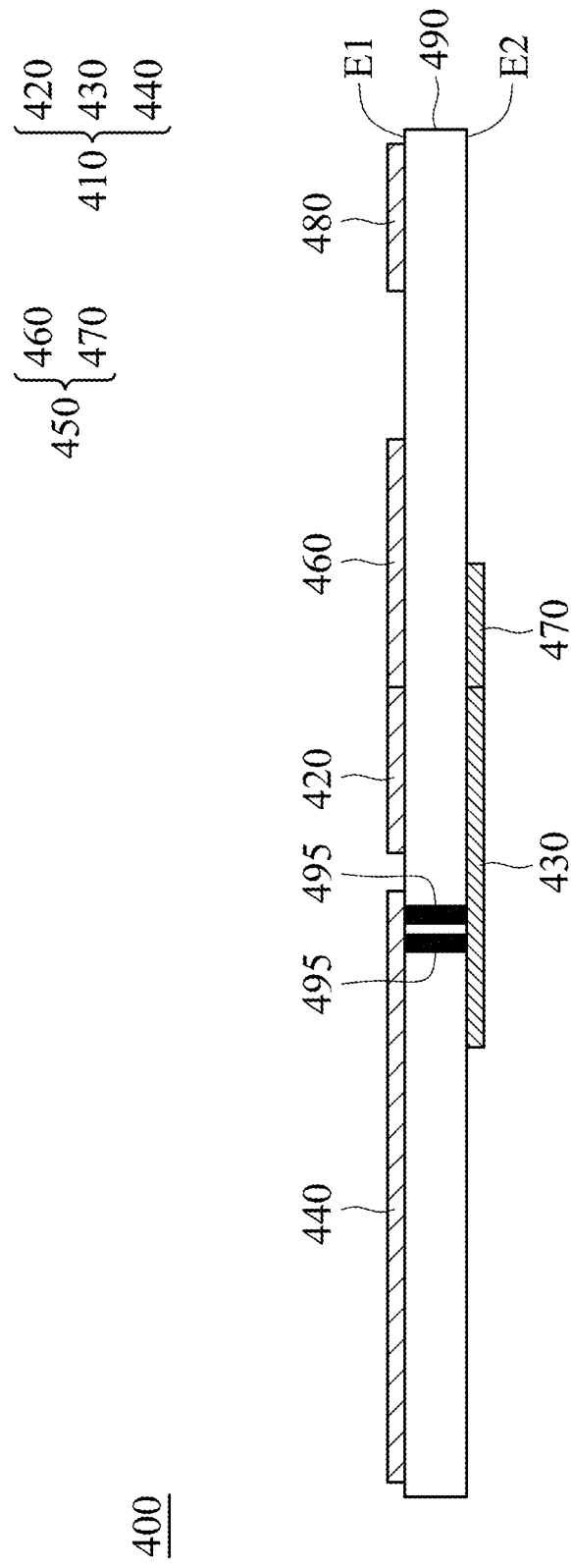
FIG. 4D is a sectional view of an antenna structure according to an embodiment of the invention.

The dielectric substrate 490 may be a PCB. The dielectric substrate 490 has a first surface E1 and a second surface E2 which are opposite to each other. The ground element 405, the first segment 420, the third segment 440, the fourth segment 460, and the third radiation element 480 are all disposed on the first surface E1 of the dielectric substrate 490. The second segment 430 and the fifth segment 470 are both disposed on the second surface E2 of the dielectric substrate 490. FIG. 4B is a top view of partial elements of the antenna structure 400 disposed on the first surface E1 of the dielectric substrate 490 according to an embodiment of the invention. FIG. 4C is a see-through view of the other elements of the antenna structure 400 disposed on the second surface E2 of the dielectric substrate 490 according to an embodiment of the invention (i.e., the dielectric substrate 490 is considered as a transparent element). FIG. 4D is a sectional view of the antenna structure 400 according to an embodiment of the invention (along a sectional line LC1 of FIG. 4A). Please refer to FIG. 4A, FIG. 4B, FIG. 4C, and FIG. 4D together.

In the first radiation element 410, the first segment 420 may substantially have a small inverted U-shape. Specifically, the first segment 420 has a first end 421, a second end 422, and a third end 423. A feeding point FP2 is positioned at the first end 421 of the first segment 420. The second end 422 and the third end 423 of the first segment 420 are two open ends, which may substantially extend in the same direction. The feeding point FP2 may be further coupled to a signal source 499 for exciting the antenna structure 400. The second segment 430 may substantially have a variable-width straight-line shape. Specifically, the second segment 430 has a first end 431 and a second end 432. The first end 431 of the second segment 430 may be substantially aligned with the feeding point FP2. The second end 432 of the second segment 430 is an open end. The width of the first end 431 of the second segment 430 may be greater than the width of the second end 432 of the second segment 430. In some embodiments, the second segment 430 has a first vertical projection on the first surface E1 of the dielectric substrate 490, and the first vertical projection at least partially overlaps the first segment 420 and the third segment 440.

In the first radiation element 410, the third segment 440 may substantially have a large inverted U-shape. Specifically, the third segment 440 has a first end 441 and a second end 442. The first end 441 of the third segment 440 is coupled to a first grounding point GP3 on the ground element 405. The second end 442 of the third segment 440 is an open end. For example, a coupling gap GC2 may be formed between the second end 442 of the third segment 440 and the second end 422 of the first segment 420. In some embodiments, the third segment 440 further includes a rectangular widening portion 445 adjacent to its second end 442, so as to fine-tune the impedance matching of the antenna structure 400. In some embodiments, the antenna structure 400 further includes one or more conductive via elements 495, which penetrate the dielectric substrate 490 and are coupled between the third segment 440 and the second segment 430.

In the second radiation element 450, the fourth segment 460 may substantially have a variable-width straight-line shape. Specifically, the fourth segment 460 has a first end 461 and a second end 462. The first end 461 of the fourth segment 460 is coupled to the feeding point FP2. The second end 462 of the fourth segment 460 is an open end. The fifth segment 470 may substantially have an inverted L-shape. Specifically, the fifth segment 470 has a first end 471 and a second end 472. The first end 471 of the fifth segment 470 is coupled to the first end 431 of the second segment 430. The second end 472 of the fifth segment 470 is an open end. The second end 472 of the fifth segment 470 and the second end 432 of the second segment 430 may substantially extend in opposite directions. In some embodiments, the fifth segment 470 has a second vertical projection on the first surface E1 of the dielectric substrate 490, and the second vertical projection at least partially overlaps the fourth segment 460.

The third radiation element 480 may substantially have a loop shape. Specifically, the third radiation element 480 has a first end 481 and a second end 482. The first end 481 of the third radiation element 480 is coupled to a second grounding point GP4 on the ground element 405. The second end 482 of the third radiation element 480 is an open end. In this embodiment, the second end 482 of the third radiation element 480 is adjacent to the second grounding point GP4, but the invention is not limited thereto.

Figure 5:
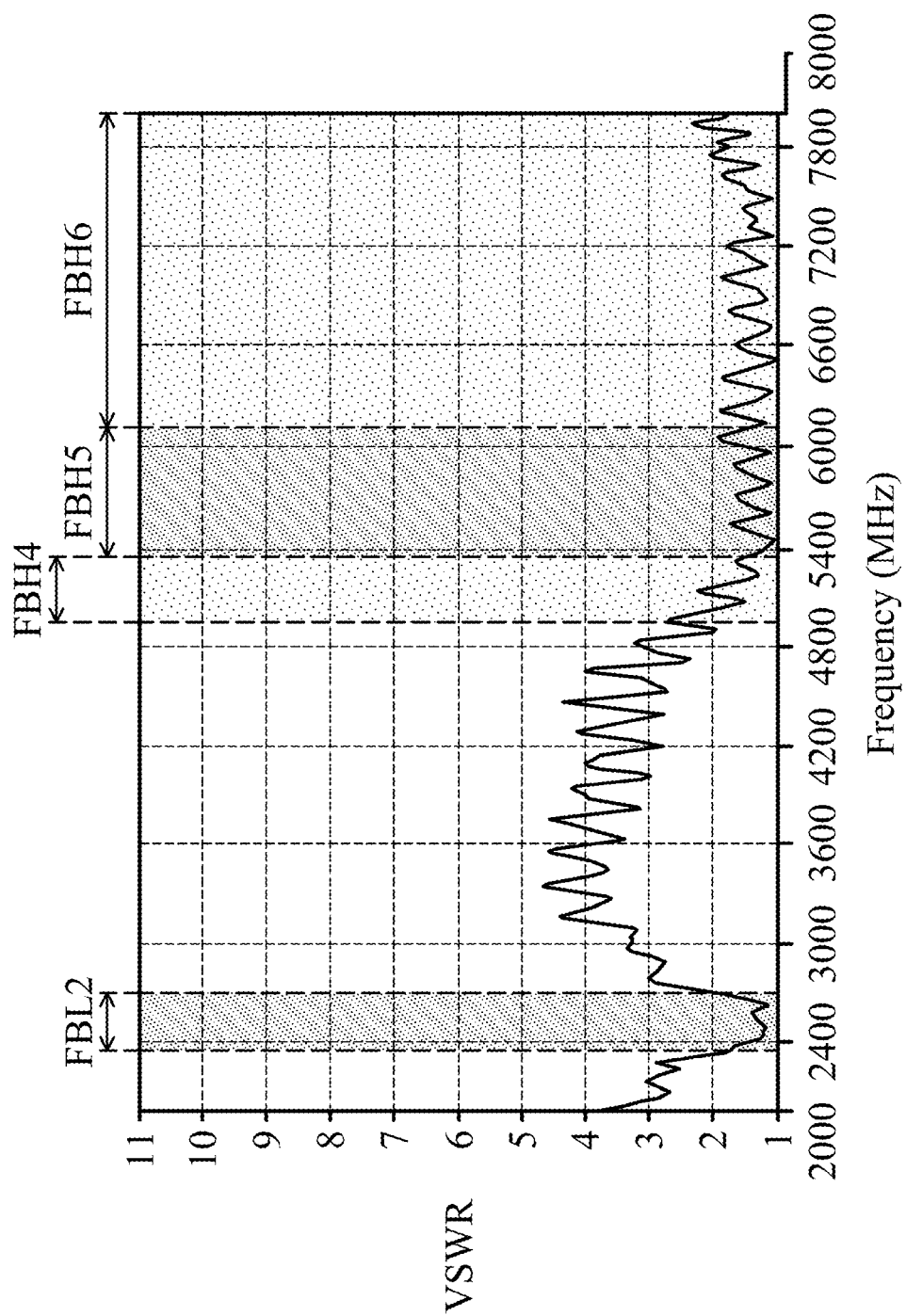
FIG. 5 is a diagram of VSWR of an antenna structure according to an embodiment of the invention.

FIG. 5 is a diagram of VSWR of the antenna structure 400 according to an embodiment of the invention. The horizontal axis represents the operational frequency (MHz), and the vertical axis represents the VSWR. According to the measurement of FIG. 5, when being excited by the signal source 499, the antenna structure 400 can cover a low-frequency band FBL2, a first high-frequency band FBH4, a second high-frequency band FBH5, and a third high-frequency band FBH6. For example, the low-frequency band FBL2 may be from 2350 MHz to 2700 MHz. The first high-frequency band FBH4 may be from 4950 MHz to 5350 MHz. The second high-frequency band FBH5 may be from 5350 MHz to 6100 MHz. The third high-frequency band FBH6 may be from 6100 MHz to 8000 MHz. Accordingly, the antenna structure 400 can support at least the wideband operations of conventional WLAN and Wi-Fi 6E of the next generation.

In some embodiments, the operational principles of the antenna structure 400 will be described as follows. The first segment 420, the second segment 430, and the third segment 440 of the first radiation element 410 are excited to generate a fundamental resonant mode, thereby forming the low-frequency band FBL2. The second segment 430 of the first radiation element 410 and the third radiation element 480 are excited to form the first high-frequency band FBH4. The fourth segment 460 and the fifth segment 470 of the second radiation element 450 are excited to form the second high-frequency band FBH5. The first segment 420, the second segment 430, and the third segment 440 of the first radiation element 410 are further excited to generate a higher-order resonant mode, thereby forming the third high-frequency band FBL6. According to actual measurements, the radiation performance of the antenna structure 400 will not be affected even if the first radiation element 410 and the second radiation element 450 are discontinuous structures which are distributed over both the first surface E1 and the second surface E2 of the dielectric substrate 490.

Figure 6:
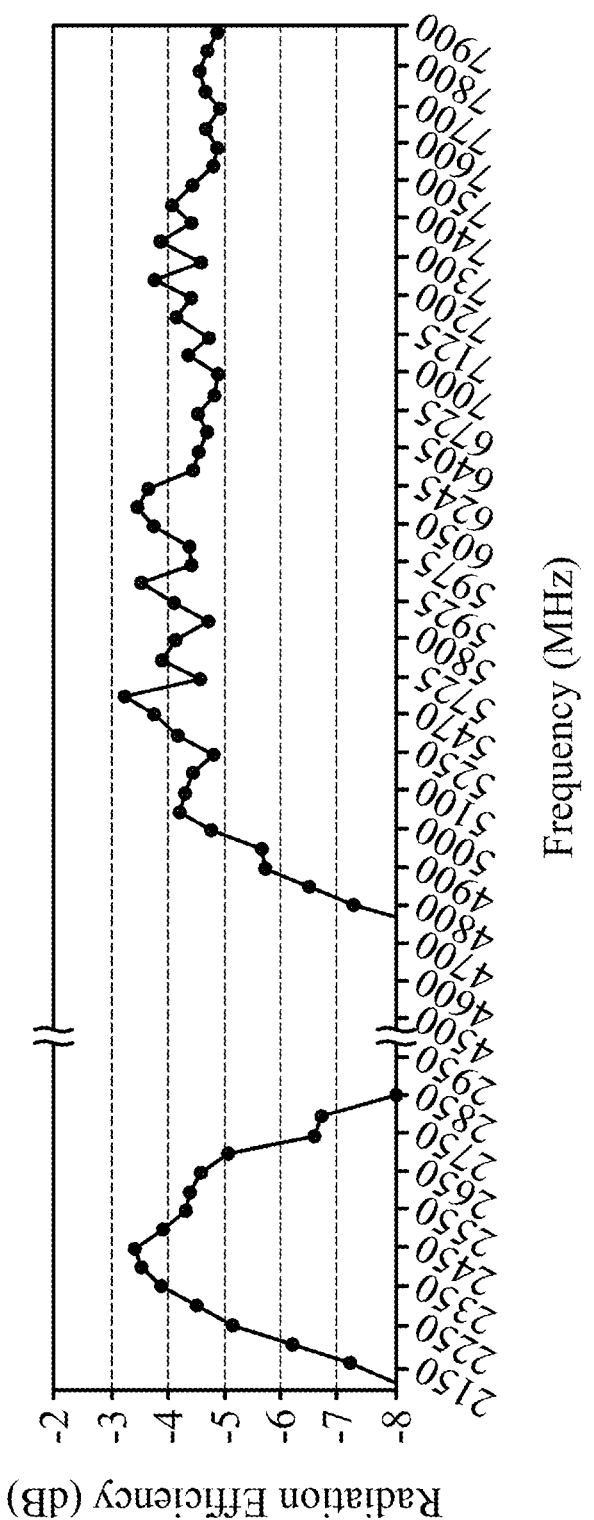
FIG. 6 is a diagram of radiation efficiency of an antenna structure according to an embodiment of the invention.

FIG. 6 is a diagram of radiation efficiency of the antenna structure 400 according to an embodiment of the invention. The horizontal axis represents the operational frequency (MHz), and the vertical axis represents the radiation efficiency (dB). According to the measurement of FIG. 6, the radiation efficiency of the antenna structure 400 can achieve −5 dB or higher within the low-frequency band FBL2, the first high-frequency band FBH4, the second high-frequency band FBH5, and the third high-frequency band FBH6 as mentioned above. It can meet the requirements of practical applications of WLAN and Wi-Fi 6E communication.

In some embodiments, the element sizes of the antenna structure 400 will be described as follows. The length L4 of the second segment 430 may be substantially equal to 0.25 wavelength (λ/4) of the first high-frequency band FBH4 of the antenna structure 400. The length L5 of the third radiation element 480 may be substantially equal to 0.25 wavelength (λ/4) of the first high-frequency band FBH4 of the antenna structure 400. The length L6 of the fourth segment 460 may be substantially equal to 0.25 wavelength (λ/4) of the second high-frequency band FBH5 of the antenna structure 400. The height H2 of the dielectric substrate 490 may be shorter than or equal to 4 mm. The distance D1 between the fourth segment 460 and the third radiation element 480 may be longer than or equal to 3 mm. The above ranges of element sizes are calculated and obtained according to many experiment results, and they help to optimize the operational bandwidth and impedance matching of the antenna structure 400. Other features of the antenna structure 400 of FIG. 4A, FIG. 4B, FIG. 4C, and FIG. 4D are similar to those of the antenna structure 100 of FIG. 1. Thus, the two embodiments can achieve similar levels of performance.

Figure 7A:
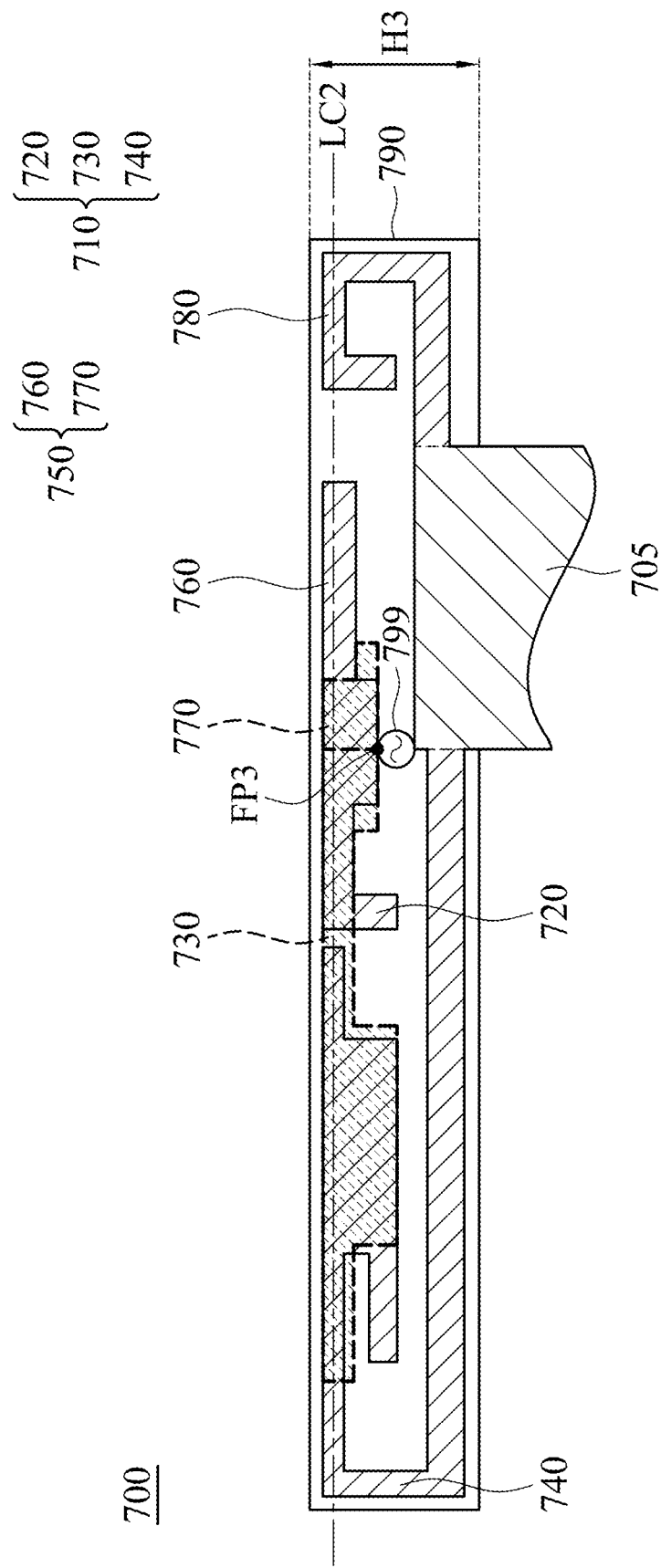
FIG. 7A is a top view of an antenna structure according to an embodiment of the invention.

FIG. 7A is a top view of an antenna structure 700 according to an embodiment of the invention. In the embodiment of FIG. 7A, the antenna structure 700 at least includes a ground element 705, a first radiation element 710, a second radiation element 750, a third radiation element 780, and a dielectric substrate 790. The ground element 705, the first radiation element 710, the second radiation element 750, and the third radiation element 780 may all be made of metal materials. Specifically, the first radiation element 710 includes a first segment 720, a second segment 730, and a third segment 740. The second radiation element 750 includes a fourth segment 760 and a fifth segment 770. The fourth segment 760 is directly coupled to the first segment 720. The fifth segment 770 is directly coupled to the second segment 730.

Figure 7B:
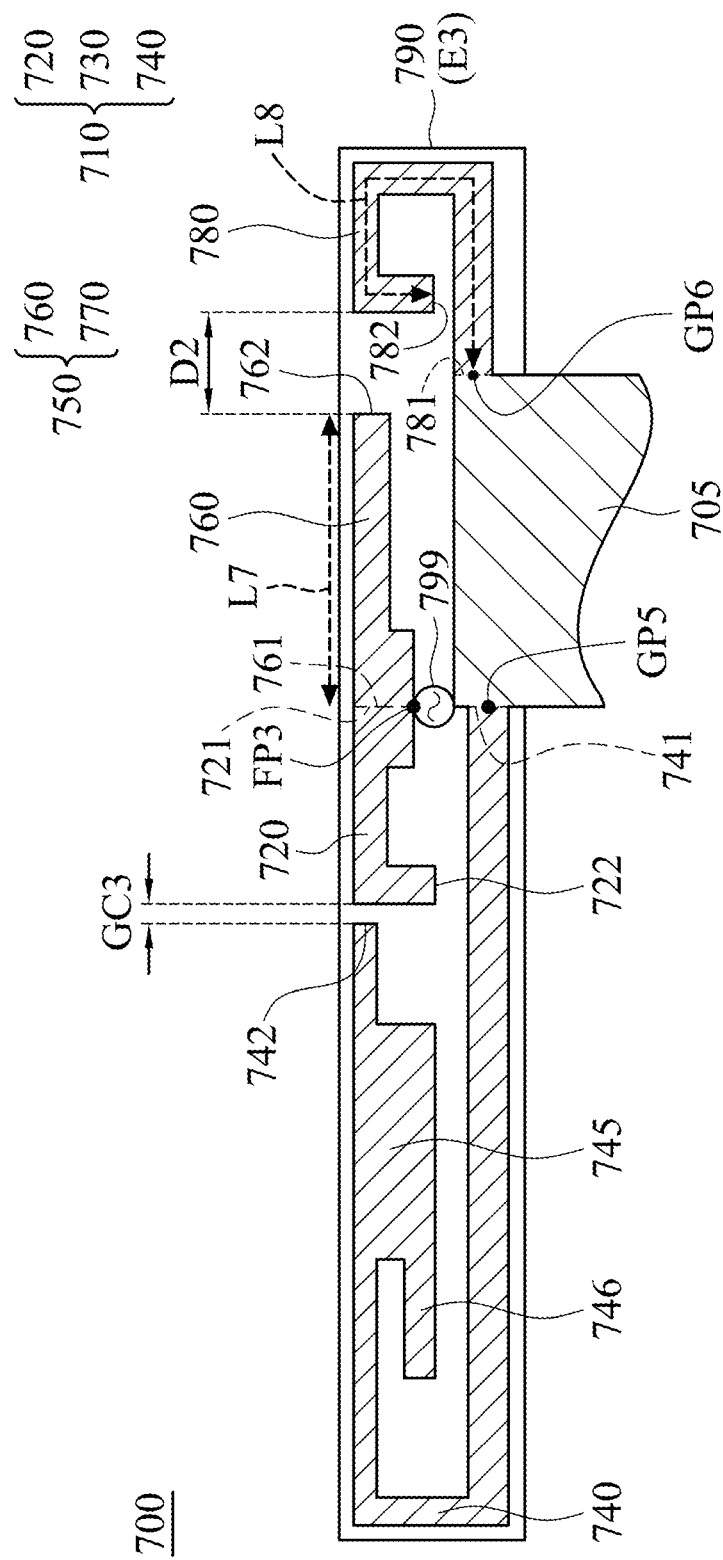
FIG. 7B is a top view of partial elements of an antenna structure disposed on a first surface of a dielectric substrate according to an embodiment of the invention.
Figure 7C:
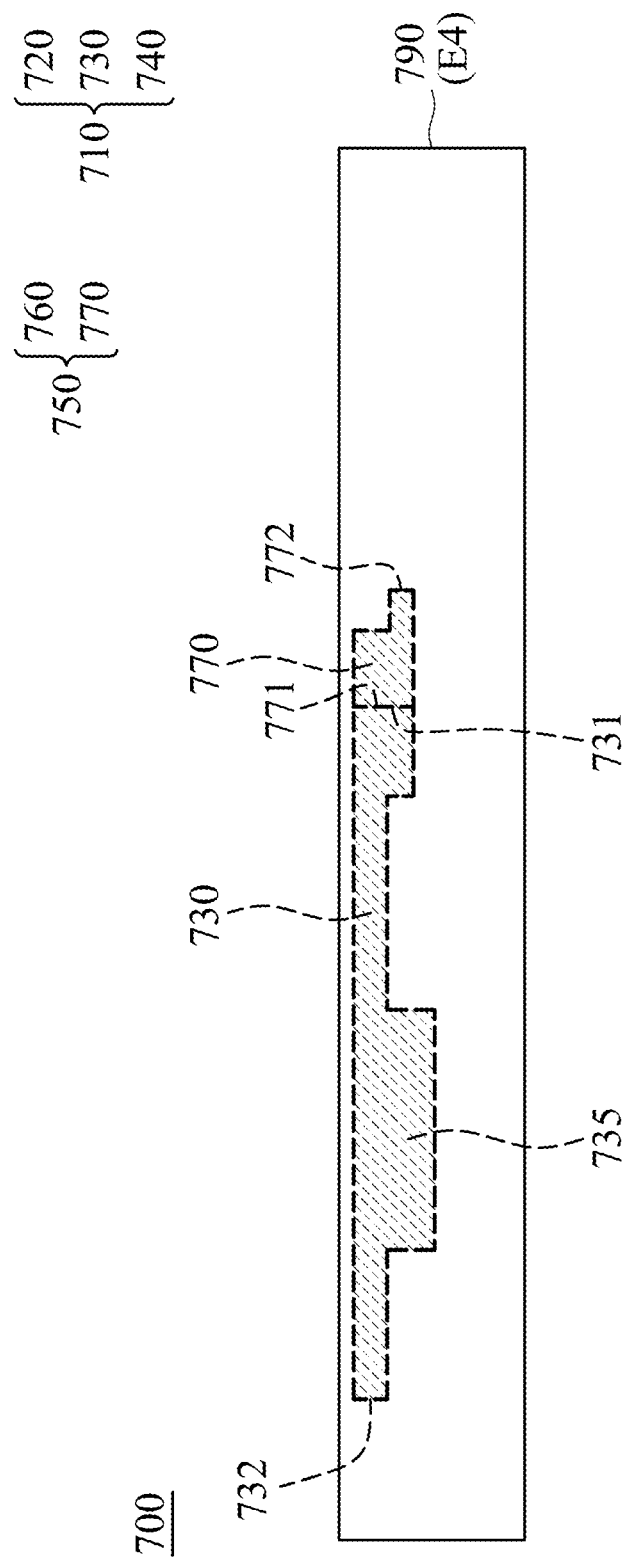
FIG. 7C is a see-through view of other elements of an antenna structure disposed on a second surface of a dielectric substrate according to an embodiment of the invention.
Figure 7D:
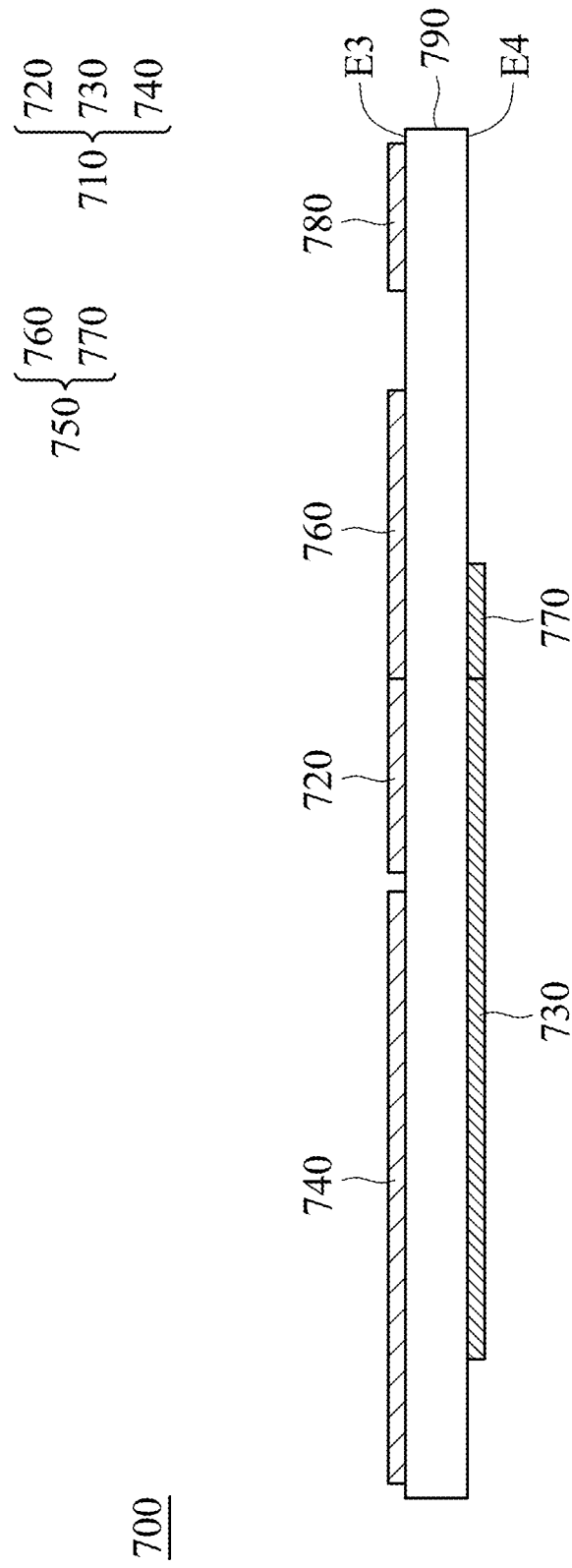
FIG. 7D is a sectional view of an antenna structure according to an embodiment of the invention.

The dielectric substrate 790 may be an FPC (Flexible Printed Circuit) with a relatively small thickness (e.g., only about 0.1 mm). The dielectric substrate 790 has a first surface E3 and a second surface E4 which are opposite to each other. The ground element 705, the first segment 720, the third segment 740, the fourth segment 760, and the third radiation element 780 are all disposed on the first surface E3 of the dielectric substrate 790. The second segment 730 and the fifth segment 770 are both disposed on the second surface E4 of the dielectric substrate 790. FIG. 7B is a top view of partial elements of the antenna structure 700 disposed on the first surface E3 of the dielectric substrate 790 according to an embodiment of the invention. FIG. 7C is a see-through view of the other elements of the antenna structure 700 disposed on the second surface E4 of the dielectric substrate 790 according to an embodiment of the invention (i.e., the dielectric substrate 790 is considered as a transparent element). FIG. 7D is a sectional view of the antenna structure 700 according to an embodiment of the invention (along a sectional line LC2 of FIG. 7A). Please refer to FIG. 7A, FIG. 7B, FIG. 7C, and FIG. 7D together.

In the first radiation element 710, the first segment 720 may substantially have a small inverted C-shape. Specifically, the first segment 720 has a first end 721 and a second end 722. A feeding point FP3 is positioned at the first end 721 of the first segment 720. The second end 722 of the first segment 720 is an open end, which extends toward the ground element 705. The feeding point FP3 may be further coupled to a signal source 799 for exciting the antenna structure 700. The second segment 730 may substantially have a variable-width straight-line shape. Specifically, the second segment 730 has a first end 731 and a second end 732. The first end 731 of the second segment 730 may be substantially aligned with the feeding point FP3. The second end 732 of the second segment 730 is an open end. Furthermore, the second segment 730 may further include a first rectangular widening portion 735. In some embodiments, the second segment 730 has a first vertical projection on the first surface E3 of the dielectric substrate 790, and the first vertical projection at least partially overlaps the first segment 720 and the third segment 740.

In the first radiation element 710, the third segment 740 may substantially have a large inverted U-shape. Specifically, the third segment 740 has a first end 741 and a second end 742. The first end 741 of the third segment 740 is coupled to a first grounding point GP5 on the ground element 705. The second end 742 of the third segment 740 is an open end. For example, a coupling gap GC3 may be formed between the second end 742 of the third segment 740 and the second end 722 of the first segment 720. In some embodiments, the third segment 740 further includes a second rectangular widening portion 745 and an extension branch 746, so as to fine-tune the impedance matching of the antenna structure 700.

In the second radiation element 750, the fourth segment 760 may substantially have a variable-width straight-line shape. Specifically, the fourth segment 760 has a first end 761 and a second end 762. The first end 761 of the fourth segment 760 is coupled to the feeding point FP3. The second end 762 of the fourth segment 760 is an open end, which extends toward the third radiation element 780. The fifth segment 770 may substantially have an inverted L-shape. Specifically, the fifth segment 770 has a first end 771 and a second end 772. The first end 771 of the fifth segment 770 is coupled to the first end 731 of the second segment 730. The second end 772 of the fifth segment 770 is an open end. The second end 772 of the fifth segment 770 and the second end 732 of the second segment 730 may substantially extend in opposite directions. In some embodiments, the fifth segment 770 has a second vertical projection on the first surface E3 of the dielectric substrate 790, and the second vertical projection at least partially overlaps the fourth segment 760.

The third radiation element 780 may substantially have a loop shape. Specifically, the third radiation element 780 has a first end 781 and a second end 782. The first end 781 of the third radiation element 780 is coupled to a second grounding point GP6 on the ground element 705. The second end 782 of the third radiation element 780 is an open end. In this embodiment, the second end 782 of the third radiation element 780 is adjacent to the second grounding point GP6, but the invention is not limited thereto.

Figure 8:
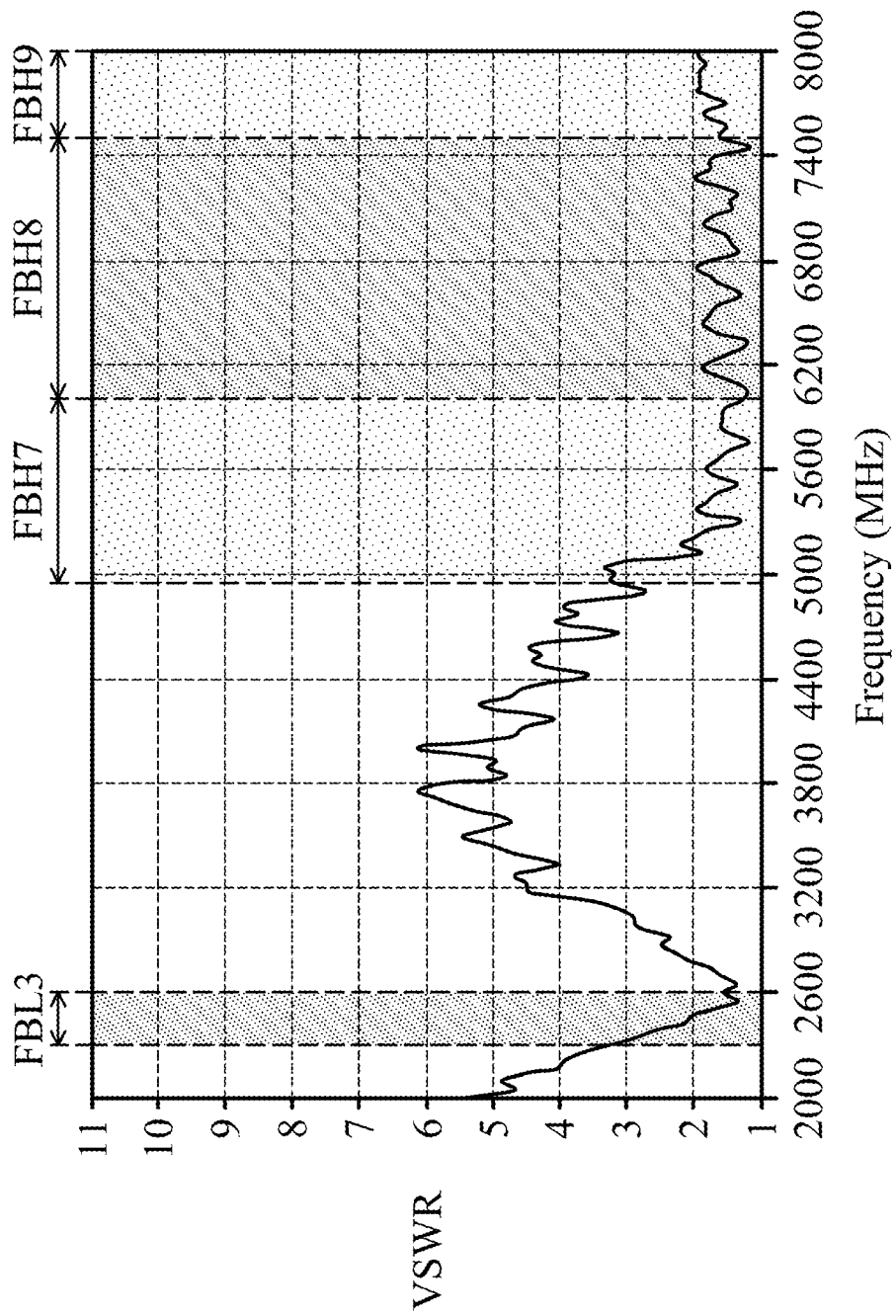
FIG. 8 is a diagram of VSWR of an antenna structure according to an embodiment of the invention.

FIG. 8 is a diagram of VSWR of the antenna structure 700 according to an embodiment of the invention. The horizontal axis represents the operational frequency (MHz), and the vertical axis represents the VSWR. According to the measurement of FIG. 8, when being excited by the signal source 799, the antenna structure 700 can cover a low-frequency band FBL3, a first high-frequency band FBH7, a second high-frequency band FBH8, and a third high-frequency band FBH9. For example, the low-frequency band FBL3 may be from 2300 MHz to 2600 MHz. The first high-frequency band FBH7 may be from 4950 MHz to 6000 MHz. The second high-frequency band FBH8 may be from 6000 MHz to 7500 MHz. The third high-frequency band FBH9 may be from 7500 MHz to 8000 MHz. Accordingly, the antenna structure 700 can support at least the wideband operations of conventional WLAN and Wi-Fi 6E of the next generation.

In some embodiments, the operational principles of the antenna structure 700 will be described as follows. The first segment 720, the second segment 730, and the third segment 740 of the first radiation element 710 are excited to generate a fundamental resonant mode, thereby forming the low-frequency band FBL3. The fourth segment 760 and the fifth segment 770 of the second radiation element 750 and the third radiation element 780 are excited to form the first high-frequency band FBH7. The first segment 720, the second segment 730, and the third segment 740 of the first radiation element 710 are further excited to generate a higher-order resonant mode, thereby forming the second high-frequency band FBL8. The second segment 730 of the first radiation element 710 and the fourth segment 760 and the fifth segment 770 of the second radiation element 750 are excited to form the third high-frequency band FBH9. According to actual measurements, the radiation performance of the antenna structure 700 will not be affected even if the first radiation element 710 and the second radiation element 750 are discontinuous structures which are distributed over both the first surface E3 and the second surface E4 of the dielectric substrate 790.

Figure 9:
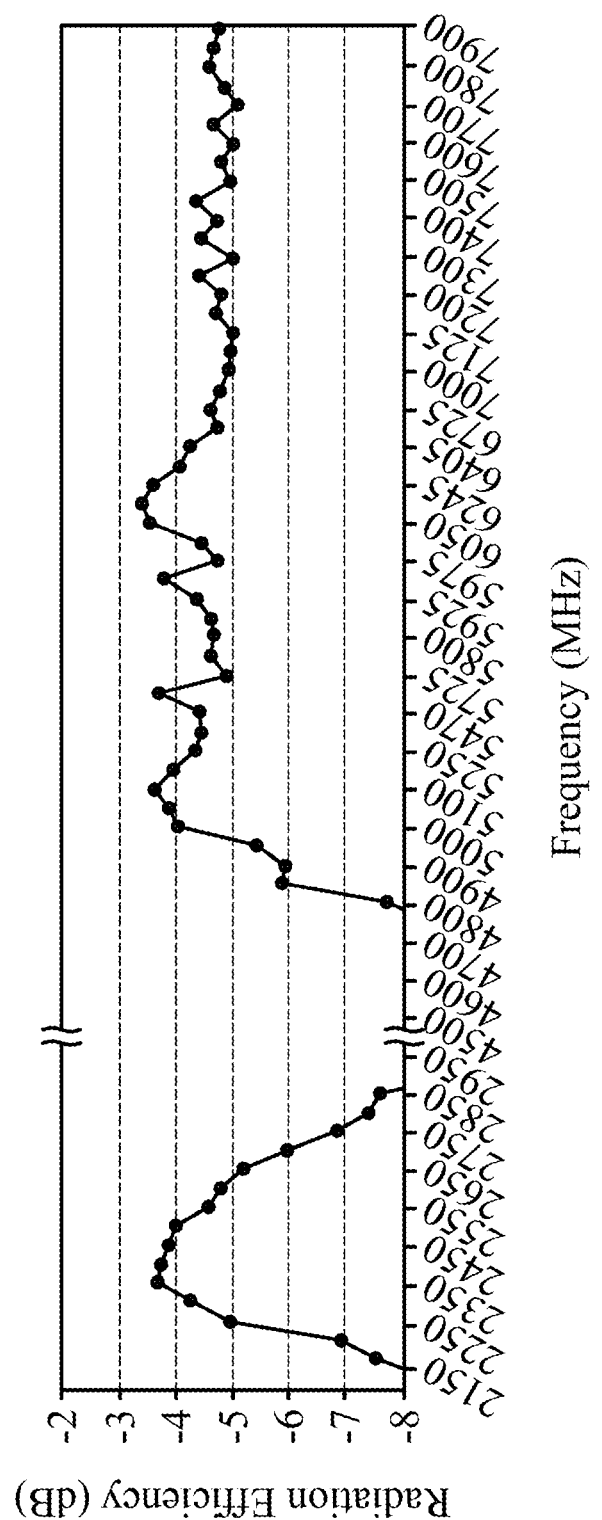
FIG. 9 is a diagram of radiation efficiency of an antenna structure according to an embodiment of the invention.

FIG. 9 is a diagram of radiation efficiency of the antenna structure 700 according to an embodiment of the invention. The horizontal axis represents the operational frequency (MHz), and the vertical axis represents the radiation efficiency (dB). According to the measurement of FIG. 9, the radiation efficiency of the antenna structure 700 can achieve −5 dB or higher within the low-frequency band FBL3, the first high-frequency band FBH7, the second high-frequency band FBH8, and the third high-frequency band FBH9 as mentioned above. It can meet the requirements of practical applications of WLAN and Wi-Fi 6E communication.

In some embodiments, the element sizes of the antenna structure 700 will be described as follows. The length L7 of the fourth segment 760 may be substantially equal to 0.25 wavelength (λ/4) of the first high-frequency band FBH7 of the antenna structure 700. The length L8 of the third radiation element 780 may be substantially equal to 0.25 wavelength (λ/4) of the first high-frequency band FBH7 of the antenna structure 700. The height H3 of the dielectric substrate 790 may be shorter than or equal to 4 mm. The distance D2 between the fourth segment 760 and the third radiation element 780 may be longer than or equal to 3 mm. The above ranges of element sizes are calculated and obtained according to many experiment results, and they help to optimize the operational bandwidth and impedance matching of the antenna structure 700. Other features of the antenna structure 700 of FIG. 7A, FIG. 7B, FIG. 7C, and FIG. 7D are similar to those of the antenna structure 100 of FIG. 1. Thus, the two embodiments can achieve similar levels of performance.

The invention proposes a novel antenna structure. In comparison to the conventional design, the invention has at least the advantages of small size, wide bandwidth, low profile, and low manufacturing cost. Therefore, the invention is suitable for application in a variety of mobile communication devices (in particular to narrow-border device).

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-9. The invention may merely include any one or more features of any one or more embodiments of FIGS. 1-9. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
    a ground element;
    a first radiation element, having a feeding point, wherein the first radiation element is coupled to a first grounding point on the ground element;
    a second radiation element, coupled to the feeding point;
    a third radiation element, coupled to a second grounding point on the ground element, wherein the third radiation element is adjacent to the second radiation element; and
    a dielectric substrate, wherein the ground element, the first radiation element, the second radiation element, and the third radiation element are disposed on the dielectric substrate;
    wherein the feeding point is positioned between the first radiation element and the second radiation element;
    wherein the antenna structure covers a low-frequency band, a first high-frequency band, a second high-frequency band, and a third high-frequency band;
    wherein a length of the first radiation element is substantially equal to 1.5 wavelength of the third high-frequency band;
    wherein the first radiation element comprises a first segment, a second segment and a third segment;
    wherein the second segment substantially has a variable-width straight-line shape aligned with the feeding point, and the second segment further comprises a first rectangular widening portion.

2. The antenna structure as claimed in claim 1, wherein the first radiation element substantially has an inverted U-shape for at least partially surrounding a slot region.

3. The antenna structure as claimed in claim 1, wherein the second radiation element substantially has a straight-line shape.

4. The antenna structure as claimed in claim 1, wherein the third radiation element substantially has a T-shape.

5. The antenna structure as claimed in claim 1, wherein a coupling gap is formed between the third radiation element and the second radiation element.

6. The antenna structure as claimed in claim 2, further comprising:
    a fourth radiation element, coupled to a first connection point on the first radiation element, and disposed inside the slot region, wherein the fourth radiation element substantially has an inverted T-shape.

7. The antenna structure as claimed in claim 6, further comprising:
    a fifth radiation element, coupled to a second connection point on the first radiation element, and disposed inside the slot region, wherein the fifth radiation element substantially has a rectangular shape.

8. The antenna structure as claimed in claim 1, wherein a total length of the second radiation element and the third radiation element is substantially equal to 0.5 wavelength of the first high-frequency band.

9. The antenna structure as claimed in claim 1, wherein a length of the second radiation element is substantially equal to 0.25 wavelength of the second high-frequency band.

10. The antenna structure as claimed in claim 1, wherein the second radiation element comprises a fourth segment and a fifth segment, wherein the first segment and the fourth segment are coupled to the feeding point, and wherein the third segment is coupled to the first grounding point.

11. The antenna structure as claimed in claim 10, wherein the dielectric substrate has a first surface and a second surface opposite to each other, wherein the ground element, the first segment, the third segment, the fourth segment and the third radiation element are disposed on the first surface of the dielectric substrate, and wherein the second segment and the fifth segment are disposed on the second surface of the dielectric substrate.

12. The antenna structure as claimed in claim 10, wherein the fourth segment is directly coupled to the first segment, and the fifth segment is directly coupled to the second segment.

13. The antenna structure as claimed in claim 10, wherein a coupling gap is formed between the third segment and the first segment.

14. The antenna structure as claimed in claim 11, wherein the second segment has a first vertical projection on the first surface of the dielectric substrate, and the first vertical projection at least partially overlaps the first segment and the third segment.

15. The antenna structure as claimed in claim 11, wherein the fifth segment has a second vertical projection on the first surface of the dielectric substrate, and the second vertical projection at least partially overlaps the fourth segment.

16. The antenna structure as claimed in claim 10, wherein a distance between the fourth segment and the third radiation element is longer than or equal to 3 mm.

17. The antenna structure as claimed in claim 10, further comprising:
   one or more conductive via elements, penetrating the dielectric substrate, and coupled between the third segment and the second segment.

18. The antenna structure as claimed in claim 1, wherein the dielectric substrate is a PCB (Printed Circuit Board) or an FPC (Flexible Printed Circuit).

* * * * *